United States Patent [19]
DeBourg et al.

[11] Patent Number: 5,881,207
[45] Date of Patent: Mar. 9, 1999

[54] STEAM GENERATOR WITH AUTOMATIC SUPPLY AND A PROCESS FOR MEASURING THE LEVEL OF LIQUID IN SUCH A GENERATOR

[76] Inventors: Jean-Pierre DeBourg, 113, rue du Professeur Beauvisage, 69008 Lyon; Denis Daulasim, 5, rue Rhonat, 69100 Villeurbanne, both of France

[21] Appl. No.: 719,539
[22] Filed: Sep. 25, 1996
[30] Foreign Application Priority Data Oct. 31, 1995 [FR] France .................................. 95 12870

[51] Int. Cl.⁶ .............................. F22B 1/28; G08B 21/00
[52] U.S. Cl. ......................... 392/401; 340/618; 340/626; 73/295
[58] Field of Search .................................. 392/394, 396, 392/400–405, 386, 387; 340/618, 622, 623, 626; 73/290, 295

[56] References Cited

U.S. PATENT DOCUMENTS

| | | |
|---|---|---|
| 2,627,015 | 1/1953 | Hackman . |
| 3,365,567 | 1/1968 | Smith et al. ........................... 392/403 |
| 3,465,315 | 9/1969 | Alexander et al. .................... 340/622 |
| 3,813,629 | 5/1974 | Szeverenyi et al. . |
| 4,532,799 | 8/1985 | O'Neil .................................. 340/622 |
| 4,590,797 | 5/1986 | Beaubatie et al. ..................... 340/622 |
| 4,881,493 | 11/1989 | Riba ....................................... 392/403 |
| 4,978,832 | 12/1990 | Rubin .................................... 392/400 |
| 5,060,560 | 10/1991 | VanDeMark ........................... 392/401 |
| 5,189,726 | 2/1993 | Pan ........................................ 392/401 |
| 5,307,440 | 4/1994 | Carretto ................................. 392/401 |
| 5,402,112 | 3/1995 | Thompson ............................. 340/622 |

FOREIGN PATENT DOCUMENTS 2168154  6/1986  United Kingdom .

OTHER PUBLICATIONS

By K. Pfister et al., "Elektrothermischer Niveauwachter", *Siemens Zeitschrift*, vol. 42, No. 9, Sep. 1968, pp. 746–748.

*Primary Examiner*—Teresa Walberg
*Assistant Examiner*—Sam Paik
*Attorney, Agent, or Firm*—Young & Thompson

[57] ABSTRACT

A steam generator with automatic supply having a level sensor arranged in a zone of a vessel located at a set threshold level, the sensor measuring the temperature and comparing it with a reference temperature, in order to establish whether a liquid reaches the threshold level, and an adjustment means acting in relation to the steam tapping operations so that the sensor temperature varies in relation to the level of liquid over a variation range, wherein the reference temperature remains within the variation range.

15 Claims, 2 Drawing Sheets

STEAM GENERATOR WITH AUTOMATIC SUPPLY AND A PROCESS FOR MEASURING THE LEVEL OF LIQUID IN SUCH A GENERATOR

BACKGROUND OF THE INVENTION

This invention relates to a steam generator with automatic supply and a device or measuring the level of liquid in such a generator. It especially relates to electric household appliances, such as ironing systems using water steam. It can also be used, for instance, for steam production boilers.

DESCRIPTION OF THE RELATED ART

A steam generator is designed to spray a liquid by a heating process, in order to produce the steam that can be tapped. In steam generators with automatic supply, the reserves of liquid are topped up from a supply source, in the spray tank vessel. For these to be adjusted automatically, it is advantageous to determine a threshold of liquid available in the vessel designed for spraying. Thus, when the actual level is inferior to this threshold, liquid can be supplied automatically and when it is superior, this supply can be switched off.

For this device to be reliable, it is necessary to know precisely the value of the liquid contained in the vessel of the steam generator. In this view, various types of sensor are well-known, making full advantage of the differences between the physical properties of the liquid and of the associated steam. Numerous embodiments are thus founded on differences in density, refraction index or acoustic transmission, among others.

A known system, based on differences in thermal dissipation is particularly interesting for its small cost. It consists in heating, at a known power, a zone situated at the level of the selected threshold inside the vessel and then in measuring the temperature of this heated zone. For a same dissipated power, the temperature of equilibrium reached is higher when the sensor is in the gas than when it is in the liquid, typically by some ten degrees. While comparing the measured temperature with a reference temperature, it is thus possible to determine in what medium the sensor is located and to deduct whether the liquid reaches the threshold level or not.

Such a sensor is for example described in the application for European patent EP-A-585.177. This document relates to a sensor of liquid usable to measure the level of a fuel in a tank. The sensor comprises a negative temperature coefficient thermistor in series with a positive temperature coefficient thermistor with progressive variation of its resistance in relation to temperature. A resistor can dissipate an electric power by a Joule effect in the sensor. The sensor also contains means to compare the value of the total resistance of the thermistors with a determined threshold.

The thermal systems exposed previously are reliable to detect the level of a liquid when the gas-liquid equilibrium does not change, for instance for an open air tank. Conversely, they prove difficult to use for a steam generator, with steam tapping. Indeed, such a tapping changes the equilibrium regime between the liquid and its pressurized steam, what causes boiling and reduces the pressure and temperature of the liquid. Thus, one can see the decrease in temperature of the zone heated at constant power, regardless whether this zone is in contact with the boiling liquid or with the steam formed on top. This insufficient differentiation is caused by the reduced pressure and by convective movements in the steam, increasing the exchanges of the latter with the heated zone and consequently the thermal dissipation phenomena.

The capacity of differentiation is further attenuated in a device where the volume is rather small, since projections caused by boiling wet the sensor.

Moreover, since the heating of the zone located at the threshold level and measuring of the temperature are normally carried out using electromechanic components, the differentiation uncertainty is made worse by the inaccuracy of these components and that of the supply voltage of the circuit.

The thermal sensors generally used thus supply non-differentiated signals in a steam generator in operation, according to whether these sensors are in the presence of liquid or of steam above a boiling liquid.

On the other hand, in a generator with high operation temperature with respect to room temperature, the temperature increase of a zone heated in a gaseous medium is slow during a steam tapping. This shortcoming is particularly detrimental in intermittent use appliances, such as ironing systems.

SUMMARY OF THE INVENTION

The purpose of the invention is to remedy these shortcomings and to offer, particularly, a steam generator with automatic supply comprising a thermal sensor whose indication does not depend on the tapping regime.

The invention thus relates to a steam generator fitted with a sensor capable of differentiating clearly the presence of a liquid or of a gas, whatever the circumstances.

The invention also relates to a steam generator comprising a thermal sensor able to reach rapidly the temperature of the liquid or gas in contact with it.

The purpose of the invention is also a steam generator fitted with a simple and cheap system enabling to adjust accurately the level of liquid in the generator's vessel in order to perform steam tappings.

Another purpose of the invention is a device for measuring the level of liquid in the vessel of a steam generator with automatic supply, enabling to determine reliably whether the level of liquid reaches a predetermined threshold level, including during a steam tapping.

In this view, the invention relates to a steam generator with automatic supply, comprising:

a heating tube comprising a vessel designed for containing a liquid, at least one heating element of the vessel, able to vaporize the liquid, and steam tapping means in the vessel, a device to supply the vessel with liquid, a sensor to measure the level of liquid in the vessel and arranged in a zone of the vessel situated at a set threshold level, whereas this sensor comprises heating means, capable of heating this zone, and measuring means to measure the temperature in this zone and to compare this reading to a reference temperature, in order to establish whether the liquid has reached the threshold level, a supply control actuated by the level sensor and acting on the supply device, providing liquid automatically to the vessel when the level of liquid is inferior to the threshold level and blocking the supply when the level of liquid is superior or equal to he threshold level.

According to the invention, the generator comprises adjustment means acting in relation to steam tapping. Thus, the temperature of the level sensor varies with respect to the level of liquid, over a variation range enabling comparison with the reference temperature, whereas this reference temperature lies within the variation range.

The adjustment means act either on the heating power of the sensor or on the reference temperature, by increasing the heating power or reducing the reference temperature, when steam is being tapped.

Steam tapping is detected either directly by the tapping control or by the pressure variation or by the variation of the liquid temperature.

At equilibrium, for a given temperature of the corresponding liquid at a given pressure of the steam formed above, the variation range is stable for a fixed heating power. When the sensor is in the liquid, its measuring means detect an inferior temperature which is superior or equal to that of the liquid outside the sensor's zone. When the sensor is in the steam, the temperature detected is a temperature superior to the former, for instance by some ten degrees. The reference temperature is thus naturally chosen in the temperature transition range comprised between the lowest and the highest temperatures.

However, when tapping steam, this temperature transition range is modified; it shows a tendency to come down to lower temperatures and to shrink at the same time. The invention is original in that the reference temperature is maintained in the temperature transition range, which is the variation range.

The invention thus provides usable signals, notably when the liquid is boiling and not only when there is a stable equilibrium between liquid and gas any more.

In a first embodiment of the generator according to the invention, the adjustment means comprise means for controlling the heating power dissipated by the heating means, capable of increasing the said heating power during steam tapping and to decrease it in the absence of such tapping.

Thanks to this heating up process, the decrease in the temperature transition range is at least partially compensated for by the increase in the heating power.

In a first preferred form of this first embodiment, the steam tapping means comprising control means of the tapping operation, the heating power control means are actuated by the tapping control and convey to the heating power a first low value or a second high value, whether the tapping control is in non-tapping or in tapping position, respectively.

This embodiment is particularly simple, since the increase in the heating power results from a single mechanical action. Moreover, while giving the heating power a low value in the absence of steam tapping, the sensor's wear is limited and energy is not dissipated uselessly when it is not necessary.

In this first form of the first embodiment, the heating means of the level sensor comprise advantageously at least one heating resistor and the control means comprise advantageously:

a junction diode in series with the heating resistor, an electric generator at the pins of the assembly composed of the diode and of the heating resistor, capable of supplying the heating resistor, a switch in parallel with the diode, actuated by the tapping device, whereby this switch is open in the absence of steam tapping and closed in the presence of such tapping, so that the high value corresponds to the double of the low value.

This doubled heating power during steam tapping is quite adequate, even if this ratio is not optimized.

The electric generator may particularly consist of a mains supply.

In a second preferred form of the first embodiment of the generator according the invention, the generator comprises a pressure sensor capable of measuring the pressure of the steam in the vessel and of transmitting to the power control means a pressure-depending signal. These control means produce a heating power in decreasing function of the pressure.

The temperature transition range is thus more or less preserved at its position of equilibrium, thanks to continuous adjustment.

In a third preferred form of the first embodiment of the generator according to the invention, the generator comprises an auxiliary temperature sensor placed in the liquid capable of measuring the liquid temperature and of transmitting to the temperature control means a signal depending on the liquid temperature. These control means produce a heating power in decreasing function of the liquid temperature.

In a second preferred embodiment of the steam generator according to the invention, the adjustment means comprise means to control the reference temperature, capable of reducing this reference temperature during steam tapping and of increasing this temperature in the absence of such tapping.

Thus, instead of preserving a constant reference temperature and of maintaining the temperature transition range around this reference temperature, the reference temperature is made to follow the variations of the transition range.

In a first preferred form of this second embodiment, the generator comprises an auxiliary temperature sensor located in the liquid, capable of measuring the temperature of the liquid and of transmitting to the temperature control means a signal depending on the liquid temperature. These control means produce a reference temperature in increasing function of the liquid temperature.

Advantageously, the reference temperature is the sum of the liquid temperature and of a set temperature threshold.

In the latter case, instead of comparing the temperature detected by the measuring means of the level sensor at a set reference temperature, the temperature deviation between the level sensor and the auxiliary temperature sensor is the main point of interest. It is this temperature deviation which is compared to the predetermined threshold in order to control possible supply of liquid. There is therefore no more need to consider pressure variations in the steam, which enables to resort to a single heating regime.

In a second preferred form of this second embodiment, the generator comprises a pressure sensor, capable of measuring the pressure of the steam in the vessel and of transmitting to the temperature control means a signal depending on the pressure. These control means produce a reference temperature in increasing function of the liquid temperature.

Preferably, the steam generator according to the invention comprises power cut-off means linked to the heating means of the level sensor, causing the heating power to be nil during any supply of liquid.

The level sensor has therefore two operation regimes: a first one corresponding to the maintenance of the reference temperature within the temperature transition range and the second one corresponding to the heating power cut-off when supplying liquid. This second operation regime has priority over the first one, whereas the heating power is systematically nil during supply.

The heating tube comprises advantageously a "glove finger" housing inside the vessel, fixed at the threshold level and designed for containing the level sensor.

It is thus interesting that the sensor comprises a thermally conducting and electrically insulating substance, in which the measuring as well as the heating means are immersed.

The invention also relates to a measuring process of a liquid level in a vessel of a steam generator with automatic supply, whereby the process consists of the following stages:

a zone of the vessel located at a set threshold level is heated to a predetermined heating power, the temperature is measured in this zone, the temperature measured is compared to a reference temperature, in order to establish whether the liquid level reaches the threshold level, if the liquid level is inferior to the threshold level, the vessel is supplied with liquid, if the liquid level is superior or equal to the threshold level, the supply is blocked.

The process is characterized in that a temperature variation range is adjusted in relation to steam tapping, the former varying in relation to the level of liquid and to the reference temperature so that the reference temperature is within the variation range.

Preferably, when supplying the vessel with liquid, the heating of the zone is switched off.

BRIEF DESCRIPTION OF THE DRAWINGS

The invention will be illustrated without being limited whatsoever by the following description to a specific embodiment, with reference to the appended drawings, on which.

DESCRIPTION OF THE PREFERRED EMBODIMENTS

Figure 1:
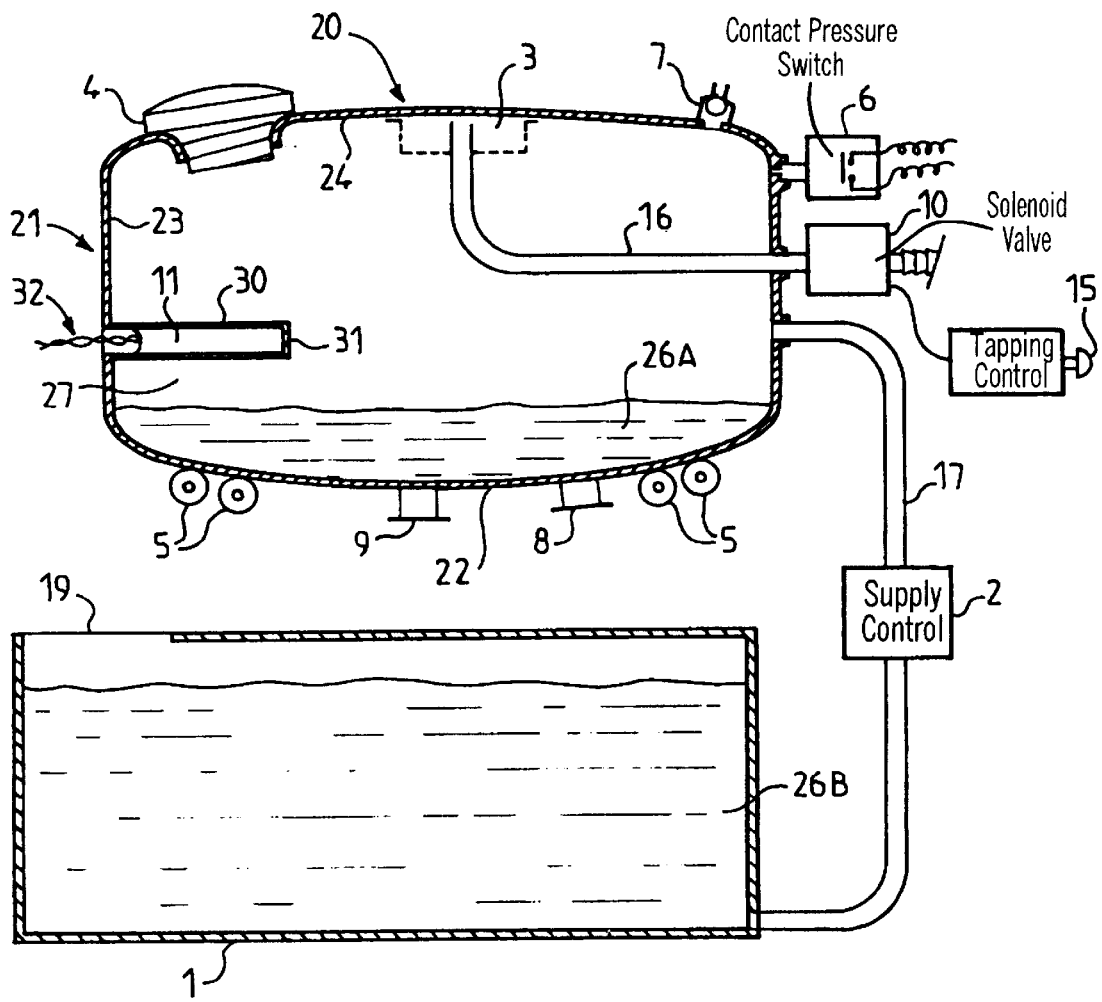
FIG. 1 shows the longitudinal section of a steam generator according to the invention.

The steam generator represented diagrammatically on FIG. 1 comprises a heating tube 20 designed for accommodating a liquid 26, in the form 26A and for heating it into a steam 27 that can be tapped. The liquid 26 is typically water.

The heating tube 20 is linked by a supply hose 17 to a tank 1 capable of storing the liquid 26 in the form 26B. The tank 1 has an opening 19 enabling fill-up. In the particular example selected, its storage capacity is approximately one liter and it is made of stainless steel.

The supply hose 17 is fitted with a supply control 2 in the form of an electromagnetic pump, enabling to adjust accurately the liquid supply 26 of the heating tube 20 by the tank 1. This supply control 2 is linked to an electronic circuit 33 (shown in FIG. 3) controlling its operation.

The heating tube 20 comprises a vessel 21 composed of a bottom 22 and of an upper section 24, united by a side wall 23. For example, the capacity of this vessel 21 is approximately one liter and it is made of stainless steel. The vessel 21 comprises in its upper section 24 an air intake valve 7 which enables to inject, inside the vessel 21, room air at atmospheric pressure between two uses of the generator. The vessel 21 is also fitted with a detachable plug 4, whereby this plug 4 can be removed for draining, maintenance and cleaning purposes.

The heating tube 20 also comprises heating elements 5 soldered underneath the bottom 22, whereas these heating elements 5 consist of electric resistors. A thermostat 8 and a safety thermostat 9 are placed underneath the bottom 22 and serve to ensure that the liquid temperature 26 remains constant. The purpose of a thermostat 8 placed underneath the bottom 22 is to limit heating-up in case of liquid 26 lacking in the vessel 21, which can be caused by an insufficient quantity of liquid in the tank 1 or by a failure of the supply control 2.

A safety thermostat 9 has been arranged to act in case of failure of the thermostat 8.

A contact pressure switch 6 fixed at the top of the side wall 23 enables to maintain the steam 27 at a constant pressure and the liquid 26 at the corresponding temperature. The pressure switch 6 and the thermostats 8 and 9 are linked to the heating elements 5 and control their operation.

The heating tube 20 also comprises the means for tapping the steam 27 from the vessel 21 in view of an outside usage. These means comprise specially tapping hose 16 leading to a tapping zone 3 in the vicinity of the upper section 24 of the vessel 21. The tapping hose 16, elbowed, goes through the side wall 23 and extends to the outside to a device using the steam 27, such as a hand iron. The tapping hose 16 is fitted with a solenoid valve 10 for steam tapping, linked to a tapping control 15. The tapping control 15 is a device such as a push-button, thanks to which the user can manually control the steam extraction.

The side wall 23 of the tank 21 comprises, on the side opposite the outlet of the supply hose 17, a tubular reinforcement in the shape of a glove finger, oriented to the inside of the vessel 21 and constituting a housing 30. This housing 30 has an end 31 closed inside the vessel 21 and open to the outside. Its position determines a threshold level of the liquid 26 in the vessel 31. The housing 30 contains a thermal sensor 11, electrically supplied by power supply electric wires 32.

Figure 2:
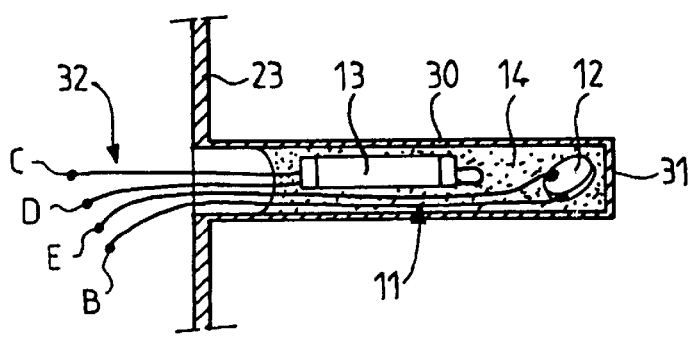
FIG. 2 details the longitudinal section of the steam generator's sensor of FIG. 1.

The sensor 11 arranged in the housing 30 is detailed on FIG. 2. It comprises a thermistor 12 with positive temperature coefficient or PTC, placed very close to the end 31 of the housing 30 and designed for measuring the temperature in the vicinity of the former. The sensor 11 also contains a heating resistor 13 whose function lies in heating the housing 30.

The power of the heating resistor 13 has been selected high enough to obtain rapid heating-up of the sensor 11 and low enough to avoid large bubbling effects around the housing 30.

Typically, the heating resistor 13 has a value of about 1.5 k-ohms, in order to produce approximately a heating power of 35 watts when supplied by an alternate voltage of 220 volts. The thermistor 12 and the heating resistor 13 are electrically supplied each using two of the electric wires 32. They are embedded in a thermally conducting and electrically insulating resin 14.

Figure 3:
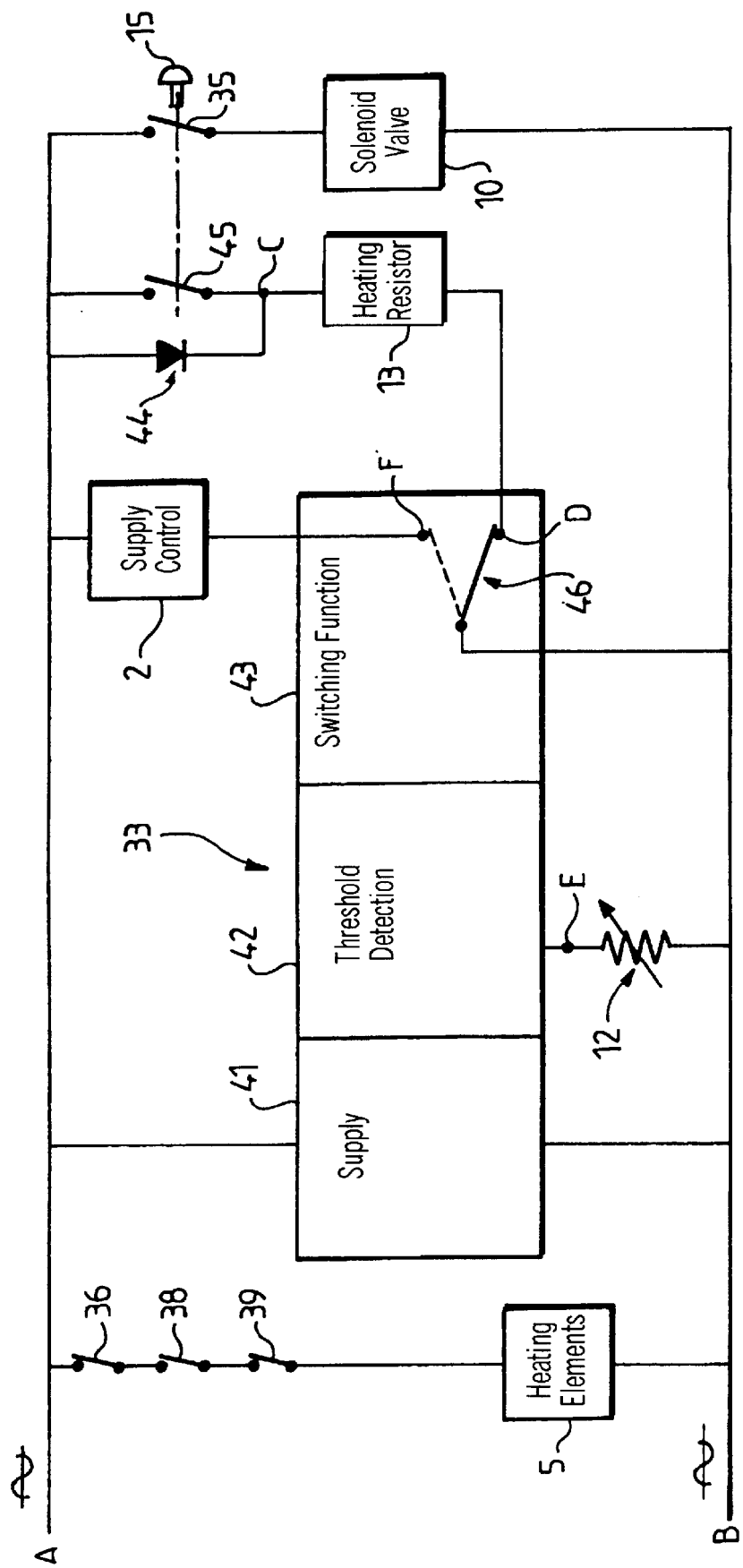
FIG. 3 presents a sketch of the electronic control circuits associated with the team generator of FIG. 1.

The thermistor 12, the heating resistor 13, the supply control 2 as well as the solenoid valve 10 are linked to the electronic control circuit 33, sketched on FIG. 3.

In all the following, the points of same electric potentials are designated by the same references.

The electronic circuit 33, FIG. 3, is linked to the mains and its upper and lower supply pin are designated by A and B, respectively.

The solenoid valve 10 is in series with a first switch 35 that can be actuated by the tapping control 15.

On the other hand, the heating elements 5 are in series with three switches 36, 38 and 39 which can be actuated respectively by the pressure switch 6, the thermostat 8 and the safety thermostat 9.

The electronic circuit 33 consists of three sections 41, 42, 43, sketched in the form of blocks on FIG. 3. A first section 41 corresponds to the supply of the electronic circuit 33 and is linked to the supply pins A and B.

A second section 42 comprises a threshold detection and is linked to a first pin E of the thermistor 12, whereas the second pin of the thermistor 12 is the lower supply pin B. This second section 42 is capable of detecting a threshold voltage at the pins B, E of the thermistor 12, obtained for a reference temperature and of producing an associated amplification. The latter enables to differentiate the presence of liquid 26 or of steam 27 in the vicinity of the housing 30, thanks to the differences in thermal dissipation in liquids or in gases.

The third section 43 has a switching function and enables to supply either the heating resistor 13 or the supply control 2. It contains notably a toggle switch 46 linked to the lower supply pin B and fitted with two possible positions.

In a first position, so-called supply position, it is in contact with a first pin F of the supply control 2, whereas the second pin of the latter is the upper supply pin A. In the second position, so-called heating position, the toggle switch 46 is in contact with a first pin D of the heating resistor 13.

The heating resistor 13 is by its second pin C linked to a fifth switch 45, that can actuated by the tapping control 15 and connected to the upper supply pin A. A junction diode 44 is arranged in parallel to the switch 45.

During operation, the tank 1 receives in priority a quantity of liquid 26 designed for supplying the heating tube 20. This liquid 26 is typically at the temperature and at the atmospheric pressure in the tank 1. Initially, the switches 35 and 45 are open and the toggle switch 46 is in heating position.

The start-up of the steam generator causes the pressure switch 6 to be actuated, which imposes in the enclosure of the vessel 21 the pressure and temperature desired, while closing of the switch 36. The switch 38, generally closed, is open by the thermostat 8 when the maximum temperature is exceeded. The switch 39, actuated by the safety switch 9, intervenes in the same manner in case of failure of the thermostat 8. In the example of implementation here presented, which relates to a water steam generator for hand iron, this pressures is about 3 bars. Once this pressure has been reached, the pressure switch 6 causes the heating elements 5 to stop. The thermostat 8 enables to avoid excessive heating-up of the vessel 21, in case of lack of water and absence of pressure. In the implementation example, the liquid 26 being water and the imposed pressure being of 3 bars, the temperature is close to 144° C.

As soon as the steam generator has started, the electronic control circuit 33 is mains supplied. The heating resistor 13 then receives a mono-alternance rectified current from the junction diode 44. Thus it produces a heating power typically of about 17 watts. The heat dissipated by the heating resistor 13 is dissipated relatively little in the air surrounding the housing 30, so that the temperature of the sensor 11 increases rapidly.

The thermistor 12, thermally in contact with the heating resistor 13, then sees its resistance increase with its temperature.

The voltage at the pins B, E of the thermistor 12 becomes rapidly equal to the threshold voltage symptomatic of the presence of gas. The second portion 42 of the electronic circuit 33 detects this threshold voltage and causes in the third portion 43 the toggle switch 46 to leave the heating position for the supply position.

The supply control 2 thus enables the supply of water and, simultaneously, the circulation of current in the heating resistor 13 is interrupted.

The liquid 26 is thus sucked in by the electromagnetic pump 2 through the supply hose 17 up to the vessel 21 of the heating tube 20, so that the vessel 21 starts to fill up.

The liquid 26 filling the vessel 21 is partially evaporated by means of the heating elements 5, producing the steam 27. The boiling phase of the liquid 26 in the absence of steam tapping is sufficiently low not to disturb the measurements performed by the sensor 11.

Since the heating resistor 13 does not create any heat any more during the supply phase, the temperature of the thermistor 12 decreases progressively by natural loss and then becomes inferior to the reference temperature again. The second portion 42 of the electronic circuit 33 detects this transition and causes in the third portion 43, the toggle switch 46 to leave the supply position for the heating position.

Consequently, the supply of liquid 26 to the vessel 21 is interrupted and, simultaneously, the heating resistor 13 resumes generating heat. The previous process is thus repeated, whereas the vessel 21 being then supplied in successive stages. This enables mastering the filling operation; indeed if it were too sudden, the temperature of the heating tube 20 would decrease excessively and the pressure would be reduced.

The controlling of liquid supply 26 obtained thanks to the electronic circuit 33 restricts the temperature of the sensor 11 to values close to the reference temperature, which prevents all damages.

The level of liquid 26 continues to increase until the housing 30 is in contact with it. The level of liquid is then equal to the threshold level. At that moment, the heat generated by the heating resistor 13 is dissipated in the liquid 26, so that the temperature of the thermistor 12 remains lower than the reference temperature. Consequently, the supply ceases and the level of liquid is stabilised around the threshold level. At that stage, the liquid 26 is in equilibrium with its steam 27 in the vessel 21.

During steam tapping, the user actuates the tapping control 15. The latter closes the first switch 35 and thus causes the passage of a current in the solenoid valve 10 of steam tapping, which enables extracting steam 27 by means of the tapping hose 16. Simultaneously, actuating the tapping control 15 closes the switch 45, which short-circuits the junction diode 44, so that the heating power is doubled. In the implementation example, it jumps from 17 to 35 watts.

The significant increase in heating power by means of steam tapping enables to obtain usable signals in spite of the violent boiling of the liquid 26.

On the other hand, the limited heating power used in the absence of tapping enables to avoid useless additional consumption costs.

Especially, the reference temperature used in the absence of steam tapping 27 continues to provide with a valid criterion to distinguish steam 27 from liquid 26. Indeed, the lowering of the temperature transition range, caused by the global decrease in the temperature further to the tapping, is compensated for at least partially by the increase in the heating power. The doubling of this power proves to be adequate in order to maintain the set reference temperature within the transition range.

Once the tapping of steam 27 completed, the tapping control 15 ceases to be actuated, which opens simultaneously the switches 35 and 45. The solenoid valve 10 ceases then to be actuated and the heating resistor 13 is again supplied via the junction diode 44.

The steam generator with automatic supply according to the invention thus proves reliable and economical and can be used a great number of times without wear nor deterioration.

According to a first variation of the steam generator of FIG. 1, the pressure switch 6 produces a signal in relation of the pressure of steam 27 in the vessel 21 and the assembly composed of the diode 44 and of the switch 45 is suppressed.

Moreover, the electronic circuit 33 is designed for receiving the signal produced by the pressure switch 6 and is capable of modifying the duty factor of the resistor in relation to this signal, whereas the duty factor, hence the power, evolves like a decreasing function of the pressure.

Thus, during service, the heating power increases automatically and continuously during steam tapping since the pressure of the steam 27 decreases and comes back to a stable and lower value on completion of the tapping, whereby the pressure goes back to its upper and stabilised level.

According to a second variation, the resistor is replaced with several resistors of fixed value. According to the pressure measured by the pressure switch 6, one or several resistors are supplied in order to obtain a heating power in decreasing relation to the pressure. According to an advantageous and particularly simple embodiment of this second variation, there are two resistors.

Instead of being controlled by the pressure of the steam 27, the power can be controlled by the temperature of the liquid 26, the latter being also significant of the decrease in the temperature range during the tapping of steam 27. Advantageously, according to a third variation, an auxiliary unheated thermosensitive sensor is thus arranged close to the bottom 22 of the vessel 21 and transmits to the electronic circuit 33 signals depending on the temperature of the liquid 26. The circuit 33 causes the heating power to be a decreasing function of this temperature while acting on the duty factor of the resistor or on the switching of several resistors.

More generally, the invention covers any means of control enabling to increase the heating power during the tapping of steam 27 and to reduce it in the absence of such tapping, so that the reference temperature remains within the variation range previously defined.

As mentioned above, the heating of the zone 30 is systematically interrupted during a supply with liquid 26. This second regime of operation of the sensor 11 is coupled with the first, consisting in adjusting the heating power according to whether tapping takes place or not. It is predominant, since the heating of the zone 30 is systematically interrupted during supply, regardless whether steam 27 is tapped or not.

This second regime of operation is, besides, optional and can be suppressed without losing the essence of the invention. In such a case, the heating power is not negated during the supply of liquid 26, but is still subject to the first regime of operation depending on a tapping being performed. However, the second regime of operation is preferably combined to the first, in order to avoid excessive heating-up of the sensor 11.

In other variations of the steam generator according to the invention, the reference temperature is maintained within the temperature transition range, not by acting on the heating power, but directly on the reference temperature itself.

Thus, according to a fourth variation, an auxiliary thermosensitive unheated sensor is placed in the liquid 26, preferably close to the bottom 22 of the vessel 21 and provides the electronic circuit 33 with a signal depending on the temperature of the liquid 26. The assembly composed of the heating resistor 13, the diode 44 and the switch 45 is replaced with a simple heating resistor. The electronic circuit 33 is capable of modifying the reference temperature as an increasing function of the temperature of the liquid 26. Thus, when steam 27 is tapped, the reference temperature decreases at the same time as that of the liquid 26 and can be adjusted continuously in relation to the temperature transition range.

In a fifth and particularly simple variation, whereas the device is similar to that of the fifth variation, the circuit 33 is adequate to measure the temperature difference between the level sensor 11 and the auxiliary thermosensitive sensor, and to compare it to a set temperature threshold in order to control the supply of liquid 26.

This solution enables to break away from the pressure variations in the different steam regimes, whereby a single heating regime suffices to obtain the reliability desired. This fifth variation is preferably combined with the second operation regime of the sensor 11, whereas the heating of the zone 30 is interrupted when the temperature threshold is exceeded.

The variations in the reference temperature can also be made to depend on the pressure of the steam 27, instead of the temperature of the liquid 26.

It is also possible to combine the different variations presented, by acting at the same time on the heating power and on the reference temperature, or by simultaneously measuring the temperature of the liquid 26 and the pressure of the gas 27. The reliability of the steam generator can thus be increased, but this option is detrimental to its simplicity.

The conditions of implementation selected in the example can be modified without betraying the spirit of the invention. Thus, the pressure imposed in the vessel 21 by the pressure switch 6 can be determined in relation of a peculiar application requested.

The tank 1 is not subject to any imperative, apart from being water-tight, which enables very economical construction.

The vessel 21 of the heating tube 20 can exhibit various shapes, such as cylindrical, rectangular or spherical. Its dimensions can be noticeably larger than those chosen in the example of embodiment. It must be constituted of a material liable to resist high pressures as well as high temperatures, but other materials than stainless steel may be appropriate in certain applications.

Instead of appearing as a reinforcement of the side wall 23, the housing 30 can admit more compact a shape, although the adopted shape is quite judicious for the positioning of the sensor 11. The housing 30 can also be constituted of another material than that of the side wall 23, in order for instance to obtain better thermal conduction.

Other designs of the housing 30 can be considered. It may for example be plated against the side wall 23 of the vessel 21, but this leads to excessive heating powers. The adopted shape of a glove finger enables, conversely, to reduce the heating-up by better localization.

The housing 30 can also be arranged, not in the vicinity of the side wall 23 any longer, but towards the centre of the vessel 21, whereas a duct is then arranged for the passage of the electric wires 32. According to a particular embodiment, the housing 30 being separated from the side wall 23 can be moved inside the vessel 21. The position of the sensor 11 can thus be modified, as well by its disposition with respect to the side walls 23 as by its level in the vessel 21. Therefore, the threshold level is adjustable according to the requirements.

The resin 14 placed in the housing 30 can be replaced by any thermally conducting and electrically insulation substance. For exemplification purposes, this substance may consist of ceramics or alumina powder.

The liquid 26, being water in the example of embodiment, may be constituted of any other body whose steam is requested. More particularly, this can be some carbohydrate-based fuel.

The tapping control 15 manually actuated can be replaced with an automatic system.

The positive temperature coefficient (PTC) thermistor 12 can be replaced with a negative temperature coefficient (NTC) thermistor. Moreover, several thermistors can be employed simultaneously.

The electronic control circuit 33 is liable to be replaced by any other device fulfilling the same functions, while remaining within the framework of the invention.

The vessel 21 instead of being heated by electric resistors constituting the heating elements 5, can be heated by tubes in which circulates a fluid at high temperature. This heat exchanging fluid can be a liquid, such as water, or a gas, such as carbon gas or helium. The tubes are typically constituted of ferritic steels for a gaseous fluid or stainless steel for a liquid fluid and arranged preferably inside the vessel 21, towards the bottom 22. The vessel 21 can also be heated by combustion.

We claim:

1. A steam generator with automatic supply comprising:
    a heating tube (20) comprising a vessel (21) designed for containing a liquid (26), at least one heating element (5) of the vessel (21), able to vaporize the liquid (26), means (10, 15, 16) for tapping the steam (27) in the vessel (21),
    a device (1, 2, 17) to supply the vessel (21) with liquid (26),
    a level sensor (11) to measure the level of the liquid (26) in the vessel (21) and arranged in a zone (30) of the vessel (21) situated at a set threshold level, said level sensor (11) comprising heating means (13), capable of heating the said zone (30) and measuring means (12) to measure the temperature in the said zone (30) and to compare this reading to a reference temperature, in order to establish whether the liquid (26) has reached the threshold level,
    a supply control (2) actuated by the level sensor (11) and acting on the supply device (1, 2, 17), which delivers the liquid (26) automatically to the vessel (21) when the level of liquid (26) is below the threshold level and blocks the supply when the level of the liquid (26) is greater than or equal to the threshold level, and
    an adjustment means (44, 45) designed to act in response to the tapping of steam (27), so that the temperature of the level sensor (11) varies with respect to the level of liquid (26), over a variation range enabling comparison with the reference temperature, and wherein said reference temperature lies within the variation range.

2. A steam generator according to claim 1, wherein the adjustment means (44, 45) comprise means for controlling the heating power dissipated by the heating means (13), capable of increasing the said heating power during the tapping of steam (27) and to decrease it in the absence of such tapping.

3. A steam generator according to claim 2, wherein the means (10, 15, 16) for the tapping of steam (27) comprise a tapping control (15), and the control means (44, 45) of the heating power are actuated by the tapping control (15) and convey to the heating power, a first low value when the tapping control (15) is in non-tapping position, and a second high value when the tapping control (15) is in a tapping position.

4. A steam generator according to claim 3, wherein the heating means of the level sensor (11) comprise at least one heating resistor (13) and wherein the control means comprise:
    a junction diode (44) in series with the heating resistor (13),
    an electric generator at pins (A, B) of the assembly composed of the said diode (44) and of the heating resistor (13), capable of supplying the said heating resistor (13), and
    a switch (45) in parallel with the diode (44), actuated by the tapping device (5), wherein the said switch (45) is open in the absence of steam (27) tapping and closed in the presence of such tapping, so that the high value corresponds to the double of the low value.

5. A steam generator according to claim 2, further comprising a pressure sensor (6) capable of measuring the pressure of the steam (27) in the vessel (21) and of transmitting to the power control means a signal depending on the said pressure, and wherein said control means produce a heating power in decreasing function of the pressure.

6. A steam generator according to claim 2, further comprising an auxiliary temperature sensor placed in the liquid (26) capable of measuring the temperature of the said liquid (26) and of transmitting to the said temperature control means a signal depending on the said temperature of the liquid (26), and wherein the said control means produce a heating power in decreasing function of the temperature of the liquid (26).

7. A steam generator according to claim 1, wherein the adjustment means comprise means for controlling the reference temperature, capable of reducing the said reference temperature during steam tapping (27) and of increasing it in the absence of such tapping.

8. A steam generator according to claim 7, further comprising an auxiliary temperature sensor placed in the liquid (26) capable of measuring the temperature of the said liquid (26) and of transmitting to the said temperature control means a signal depending on the said temperature of the liquid (26), and wherein the said control means produce a reference temperature in increasing function of the temperature of the liquid (26).

9. A steam generator according to claim 8, wherein the reference temperature is the sum of the said temperature of the liquid (26) and of a set temperature threshold.

10. A steam generator according to claim 7, further comprising a pressure sensor (6) capable of measuring the pressure of the steam (27) in the vessel (21) and of transmitting to the temperature control means a signal depending on the said pressure, and wherein the said control means produce a reference temperature in increasing function of the temperature of the liquid (26).

11. A steam generator according to claim 1, further comprising power cut-off means (33, 46) linked to the heating means (13) of the level sensor (11), causing the said heating power to be nil during any supply of liquid (26).

12. A steam generator according to claim 1 wherein the heating tube (20) comprises a housing in the form of a glove finger inside the vessel (21), fixed at the threshold level and designed for containing the level sensor.

13. A steam generator according to claim 12, wherein the said sensor (11) comprises a thermally conducting and electrically insulating substance (14), in which the measuring (12) as well as the heating (13) means are immersed.

14. A process for measuring a level of liquid (26) in the vessel (21) of a steam generator (27) with automatic supply, comprising the steps of:

- a zone (30) of the vessel (21) located at a set threshold level is heated to a predetermined heating power,
- the temperature is measured in this zone (30),
- the temperature measured is compared to a reference temperature, in order to establish whether the level of liquid (26) reaches the threshold level,
- if the level of liquid (26) is less than the threshold level, the vessel (21) is supplied with liquid (26),
- if the level of liquid (26) is greater than or equal to the threshold level, the supply is blocked, wherein a temperature variation range of the said zone (30) is adjusted in response to steam tapping (27), the temperature varying in relation to the level of liquid (26) and to the reference temperature so that the reference temperature remains within the variation range.

15. A measuring process according to claim 14, wherein when supplying the vessel (21) with liquid (26), the heating of the said zone (30) is switched off.

* * * * *

UNITED STATES PATENT AND TRADEMARK OFFICE
CERTIFICATE OF CORRECTION

PATENT NO. : 5,881,207
DATED : March 9, 1999
INVENTOR(S) : Jean-Pierre DEBOURG et al.

It is certified that error appears in the above-identified patent and that said Letters Patent is hereby corrected as shown below:

On the title page, insert Item [73] as follows:
--[73] Assignee: SEB S.A., Ecully, France--.

Signed and Sealed this

Thirteenth Day of July, 1999

Attest:

Q. TODD DICKINSON

*Attesting Officer*  *Acting Commissioner of Patents and Trademarks*